United States Patent [19]
Shingaki et al.

[11] Patent Number: 5,963,052
[45] Date of Patent: Oct. 5, 1999

[54] SEMICONDUCTOR INTEGRATED CIRCUIT DEVICE

[75] Inventors: Yasunori Shingaki; Nobusuke Abe, both of Tokyo, Japan

[73] Assignee: Mitsubishi Denki Kabushiki Kaisha, Tokyo, Japan

[21] Appl. No.: 09/065,589

[22] Filed: Apr. 24, 1998

[30] Foreign Application Priority Data

Dec. 8, 1997 [JP] Japan ..................................... 9-337501

[51] Int. Cl.$^6$ ...................................................... G06F 7/38
[52] U.S. Cl. .................................. 326/46; 326/37; 326/38
[58] Field of Search .................................. 326/37, 38, 39, 326/40, 46

[56] References Cited

U.S. PATENT DOCUMENTS 5,892,826  4/1999  Brown et al. ................................ 380/4

FOREIGN PATENT DOCUMENTS

60/252979  12/1985  Japan .
4/329024   11/1992  Japan .
5/93762     4/1993  Japan .

*Primary Examiner*—Michael Tokar
*Assistant Examiner*—Anh Q Tran
*Attorney, Agent, or Firm*—Burns, Doane, Swecker & Mathis, LLP

[57] ABSTRACT

A semiconductor integrated circuit device incorporates logical arithmetic circuits (11) in order to set the internal circuits (7, 10) to a stable state. Each logical arithmetic circuit (11) is placed between each of input terminals (5, 9) that are not used during a boot operation mode, and each of internal circuits (7, 10).

20 Claims, 5 Drawing Sheets

FIG.4
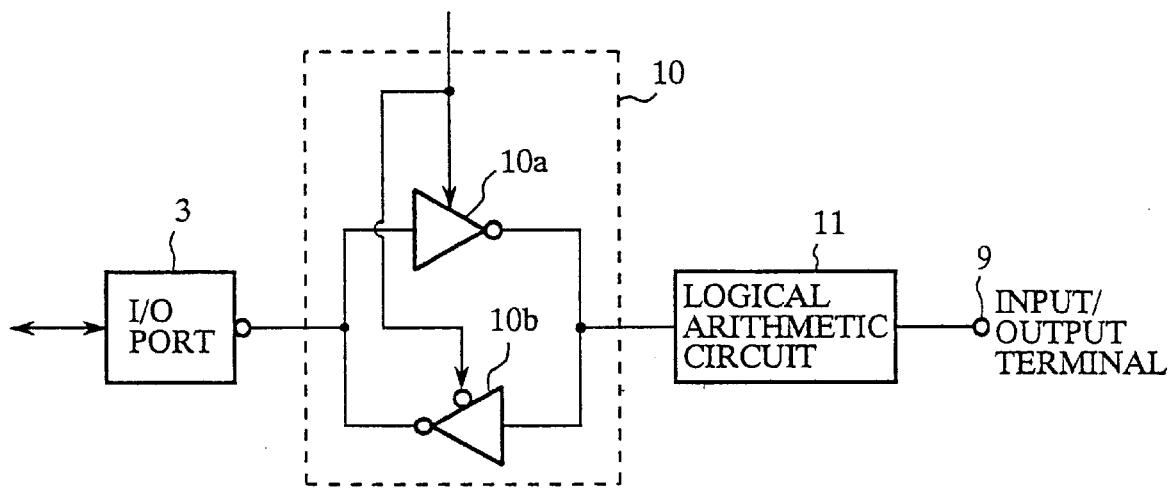
FIG.5
| | | NORMAL MODE | ... | BOOT MODE |
|---|---|---|---|---|
| MODE INPUT SIGNAL | 1 | 0 | ... | 1 |
| | 0 | 0 | ... | 1 |
FIG.6
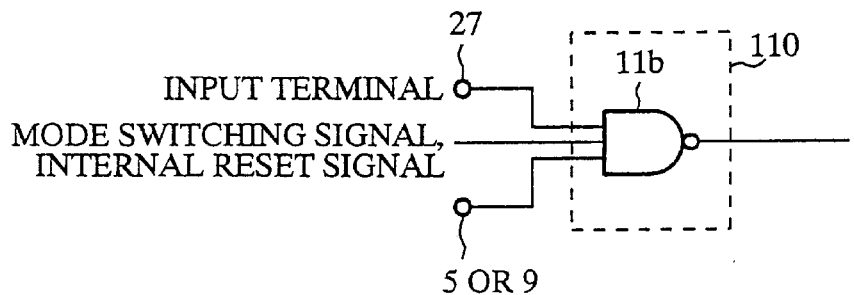

SEMICONDUCTOR INTEGRATED CIRCUIT DEVICE

BACKGROUND OF THE INVENTION

1. Field of the Invention

The present invention relates to a semiconductor integrated circuit device incorporating a flash memory circuit fabricated by a Complementary Metal Oxide Silicon fabrication process (CMOS fabrication process).

2. Description of the Prior Art

Over the past years, semiconductor integrated circuits fabricated by using the CMOS fabrication process are widely and commonly used as memories because they have the advantage of a higher integration. Recently, it is proposed and widely used to fabricate both a semiconductor integrated circuit and a flash memory circuit on a same semiconductor chip by using the CMOS fabrication process in order to increase the integration.

FIG. 10 is a block diagram showing a configuration of a conventional semiconductor integrated circuit device fabricated by the concept described above. In FIG. 10, the reference number 1 designates a central processing unit (CPU) incorporated in the semiconductor integrated circuit device, 2 denotes a flash memory circuit incorporated in the semiconductor integrated circuit device, and 3 indicates an I/O port incorporated in the semiconductor integrated circuit device. The reference number 4 designates a bus having a plurality of lines through which the CPU 1, the flash memory circuit 2, the I/O port 3, and the like are electrically connected. The reference number 5 designates each of input terminals of the semiconductor integrated circuit device, and 6 denotes each of output terminals of the semiconductor integrated circuit device. The reference number 7 indicates each of input buffers. Each input buffer 7 is located between each input terminal 5 and the I/O port 3 and provides an input signal (that is received through each input terminal 5) to each sections in the semiconductor integrated circuit device such as the CPU 1, the flash memory circuit 2, and the like. The reference number 8 indicates each of output buffers. Each output buffer 8 is located between each output terminal 6 and the I/O port 3 and drives each corresponding output terminal 6.

Next, a description will be given of one example of the operation of the conventional semiconductor integrated circuit device shown in FIG. 10.

In the conventional semiconductor integrated circuit device, when a reset signal that is inputted into the input terminal 5 to be used for resetting operation is canceled or released, the CPU 1 initiates its operation. In one concrete example, the CPU 1 initiates to perform a sequential operation based on data that have been stored in the flash memory circuit 2. Hereinafter, it is referred to as a normal operation mode.

When the semiconductor integrated circuit device described above operates during the boot operation mode in which data items are written into the flash memory circuit 2, the reset signal is canceled or released under the state in which a boot mode control signal has been inputted into the input terminal 5. Thereby, the CPU 1 judges that the mode when the reset signal is canceled or released is the start up of or the rising state of the boot mode based on the voltage level of the input terminal 5 indicating the boot mode. Then, the CPU 1 writes data items that have been provided to the data input terminal 5 into the flash memory circuit 2, sequentially. This writing operation by the CPU 1 sets various data items to be used for applications of the semiconductor integrated circuit device.

When the normal mode is risen after this boot mode, the CPU 1 reads the data items stored in the flash memory circuit 2 sequentially and executes them as initial setting operations and the like.

In order to switch the operation of the CPU 1 during the releasing operation of the reset signal, for example, a boot program to be used for executing the boot mode has been stored in a read only memory (ROM) incorporated in the semiconductor integrated circuit device. Thereby, the operation flow jumps to a starting address of the boot program according to the mode when the reset signal is canceled or released, for example.

As described above, it is possible to obtain the semiconductor integrated circuit device, in which both the central processing unit 1 and the flash memory circuit 2 are mounted on the same semiconductor chip, that is capable of applying higher versatile uses easily.

However, when the above conventional semiconductor integrated circuit device incorporating the flash memory circuit and the CPU on the same semiconductor chip fabricated by using the CMOS fabrication process is used, there causes a drawback in which the magnitude of a current flow during the boot operation mode becomes greater than that of a current flow in the normal operation mode. The increasing of the magnitude of the current flow causes to reduce the life time of the semiconductor integrated circuit device and also to decrease the reliability of the semiconductor integrated circuit device.

In order to avoid the drawback in the conventional semiconductor integrated circuit device described above, the inventors of the present invention researched and studied this conventional drawback and found the cause thereof. That is, the increasing of the current flow during the boot operation mode is caused under the state in which the voltage potential of each of the input terminals that are not used for the boot operation mode enters a floating state and input terminals of the internal devices connected to those input terminals have an immediate voltage potential that is not the high voltage level and not the low voltage level. As a result, both P channel MOS transistor and N channel MOS transistor forming each of the internal devices such as the input buffers enter the ON state. This ON state causes to flow a penetrate current through the internal circuits such as the input buffers and to increase the magnitude of the current flow during the boot operation mode. This also causes to increase the power consumption of the conventional semiconductor integrated circuit device. The inventors have solved this conventional drawback and invents the present invention.

SUMMARY OF THE INVENTION

Accordingly, an object of the present invention is, with due consideration to the drawback of the conventional semiconductor integrated circuit device, to provide a semiconductor integrated circuit device incorporating a flash memory circuit and a CPU on a same semiconductor chip that may be fabricated by using the CMOS fabrication process, and that is capable of reducing and suppressing the magnitude of a current flow during a boot operation mode.

In accordance with a preferred embodiment of the present invention, a semiconductor integrated circuit device fabricated by a Complementary Metal Oxide Silicon fabrication process (CMOS fabrication process), comprises a first memory circuit, and logical arithmetic circuits, each placed on a signal line through which each of internal circuits is connected to each of input terminals that being not used during a boot operation mode in which data items being written into said first memory circuit, for performing a logical operation between input signal inputted through said input terminals and a signal that becomes a fixed signal level during said boot operation mode, and for outputting an operation result to said internal devices.

In the semiconductor integrated circuit device as another preferred embodiment of the present invention, said logical arithmetic circuits inputs a mode switching signal, as said signal that becomes a fixed signal level during said boot operation mode, to switch operation modes of said semiconductor integrated circuit device.

In the semiconductor integrated circuit device as another preferred embodiment of the present invention, said logical arithmetic circuits inputs an input signal, as said signal that becomes a fixed signal level during said boot operation mode, transferred from said input signals that being used during said boot operation mode.

In accordance with another preferred embodiment of the present invention, a semiconductor integrated circuit device fabricated by a Complementary Metal Oxide Silicon fabrication process (CMOS fabrication process), comprises a first memory circuit, a second memory circuit, and logical arithmetic circuits. The second memory circuit inputs a reset signal and a start signal, and stores an output state of said own second memory circuit that has been set by receiving said reset signal until receiving of a following start signal. Each of the logical arithmetic circuits is placed on a signal line through which each of internal circuits is connected to each of input terminals that being not used during a boot operation mode in which data items being written into said first memory circuit. Each of the logical arithmetic circuits performs a logical operation between input signal inputted through said input terminals and an output signal transferred from said second memory circuit, and for outputting an operation result to said internal devices.

In accordance with another preferred embodiment of the present invention, a semiconductor integrated circuit device fabricated by a Complementary Metal Oxide Silicon fabrication process (CMOS fabrication process), comprises a first memory circuit, a third memory circuit, a judgement circuit, and logical arithmetic circuits. The third memory circuit inputs a reset signal and a start signal, and stores an output state of said own third memory circuit that has been set by receiving said reset signal until receiving of a following start signal. The judgement circuit inputs an output signal from said third memory circuit and a mode signal to switch operation modes of said semiconductor integrated circuit device, and outputs a judgement signal whose level during a state immediately following a reset state and during a boot operation mode in which data items being written into said first memory has a different level from a level in other states. Each of the logical arithmetic circuits is placed on a signal line through which each of internal circuits is connected to each of input terminals that being not used during said boot operation mode. Each of the logical arithmetic circuits performs a logical operation between input signal inputted through said input terminals and said judgement signal, and for outputs an operation result to said internal devices.

In the semiconductor integrated circuit device as another preferred embodiment of the present invention, each of said logical arithmetic circuits comprises a two input NAND circuit for inputting said input signal transferred from each of said input terminals as one input and for inputting a signal whose level has a low voltage level during at least said boot operation mode as another input.

In the semiconductor integrated circuit device as another preferred embodiment of the present invention, each of said logical arithmetic circuits comprises a three input NAND circuit for inputting said input signal transferred from each of said input terminals as a first input, for inputting a signal whose level has a low voltage level during at least said boot operation mode as a second input, and for inputting a reset signal as a third input.

In the semiconductor integrated circuit device as another preferred embodiment of the present invention, each of said logical arithmetic circuits is placed on a signal line through which each of input/output terminals as one of said input terminals is connected to each of said internal circuits.

In the semiconductor integrated circuit device as another preferred embodiment of the present invention, said first memory circuit is a flash memory circuit.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 4 is a block diagram showing a detailed configuration of each input/output buffer and peripheral circuits incorporated in the semiconductor integrated circuit device as the first embodiment according to the present invention;

FIG. 5 is an explanation diagram showing a corresponding relationship between two mode signals to be inputted into the semiconductor integrated circuit device of the first embodiment according to the present invention and operation modes such as the normal operation mode, the boot operation mode, and the like that are set based on the two mode signals;

FIG. 6 is a block diagram showing a configuration of a logical arithmetic circuit and peripheral circuits incorporated in the semiconductor integrated circuit device as the second embodiment according to the present invention;

DESCRIPTION OF THE PREFERRED EMBODIMENTS

Other features of this invention will become apparent through the following description of preferred embodiments which are given for illustration of the invention and are not intended to be limiting thereof.

Preferred embodiments of the semiconductor integrated circuit device according to the present invention will now be described with reference to the drawings.

First embodiment

Figure 1:
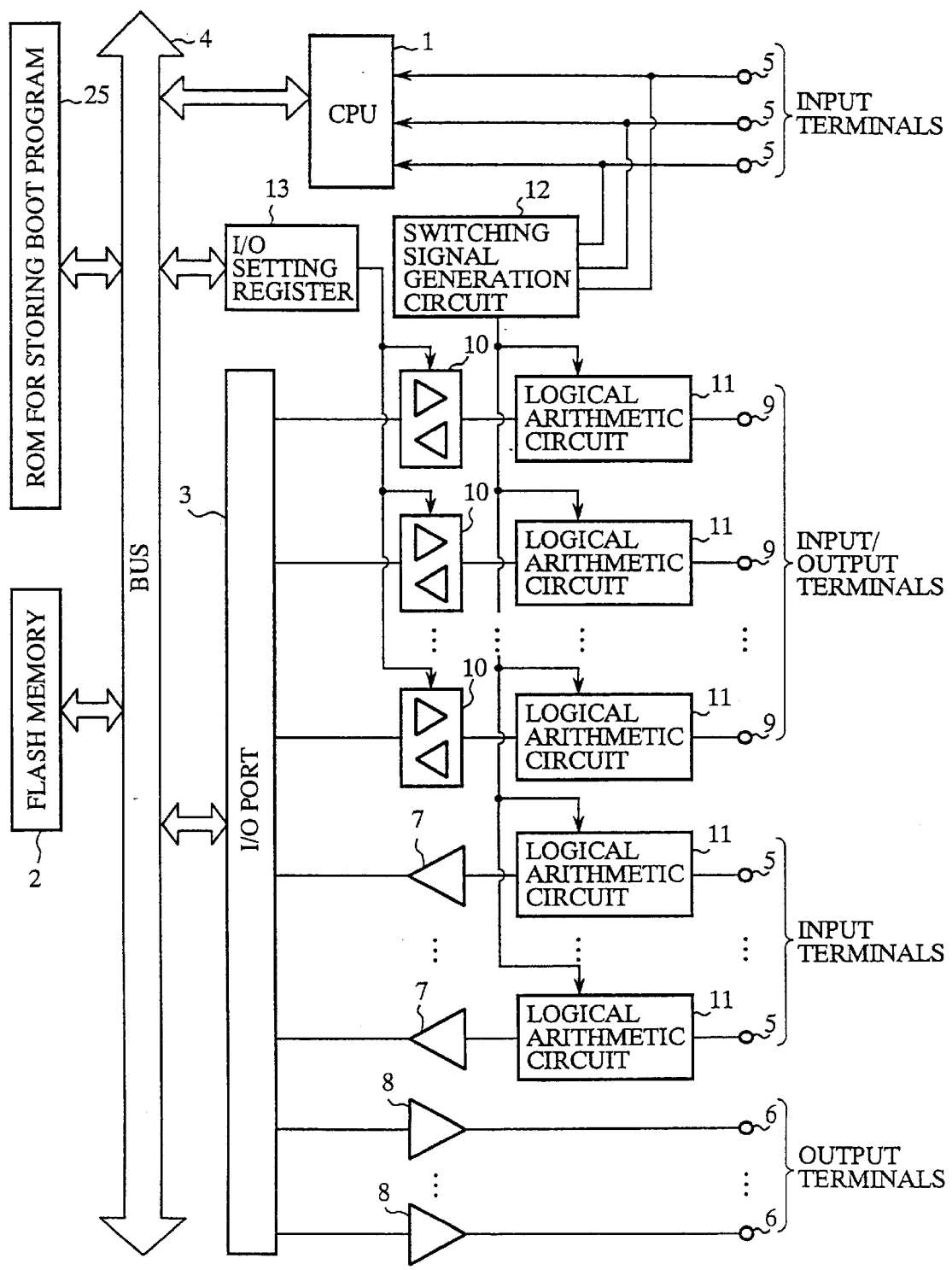
FIG. 1 is a block diagram showing a main configuration of a semiconductor integrated circuit device as the first embodiment according to the present invention.

FIG. 1 is a block diagram showing a main configuration of a semiconductor integrated circuit device as the first embodiment according to the present invention. In FIG. 1, the reference number 1 designates a central processing unit (CPU) incorporated in the semiconductor integrated circuit of the first embodiment, 2 denotes a flash memory circuit (as a first memory) incorporated in the semiconductor integrated circuit device, and 3 indicates an I/O port incorporated in the semiconductor integrated circuit device. The reference number 25 designates a Read Only memory (hereinafter referred to as ROM) for storing a boot program and other programs to be used by the CPU 1 during the execution of the boot operation mode in which initial data items are written into the flash memory circuit 2. The reference number 4 designates a bus having a plurality of lines through which the CPU 1, the flash memory circuit 2, the I/O port 3, the ROM 25, and the like are connected.

The reference number 5 designates each of input terminals of the semiconductor integrated circuit device, and 6 denotes each of output terminals of the semiconductor integrated circuit device. The reference number 9 designates each of input/output terminals of the semiconductor integrated circuit device. The reference number 7 indicates each of input buffers (as internal circuits). Each input buffer 7 is located on a line connected between each input terminal 5 and the I/O port 3 and provides an input signal (that is received through the input terminal 5) to the I/O port 3. The reference number 8 indicates each of output buffers (as internal circuits), each output buffer 8 is located on a line connected between each output terminal 6 and the I/O port 3 and outputs data that is set in the I/O port 3 to the output terminal 6. The reference number 10 designates each of input/output buffers (as internal circuits) located on a line connected between each of the input/output terminal 9 and the I/O port 3. Each input/output buffer 10 outputs data to the input/output terminal 9 and also outputs data obtained through the input/output terminal 9 to the I/O port 3. The reference number 13 designates an I/O setting register to which data items are set by the CPU 1. The data items set in the register 13 control the input/output operation of each of the plurality of input/output buffers 10. The reference number 12 designates a switching signal generation circuit for receiving a reset signal and two mode signals transferred from the input terminals 5 and generates a mode switching signal corresponding to the received reset and mode signals in order to set the state of each circuit component, and outputs the mode switching signal.

The reference number 11 designates each of logical arithmetic circuits for performing a logical arithmetic operation between the mode signal transferred from the switch signal generation circuit 12 and input signal provided through the input terminal 5. Each logical arithmetic circuit 11 is located on a line connected between each input/output buffer 10 and each input/output terminal 9, and located on a line connected between each input buffer 7 and each input terminal 5.

Figure 2:
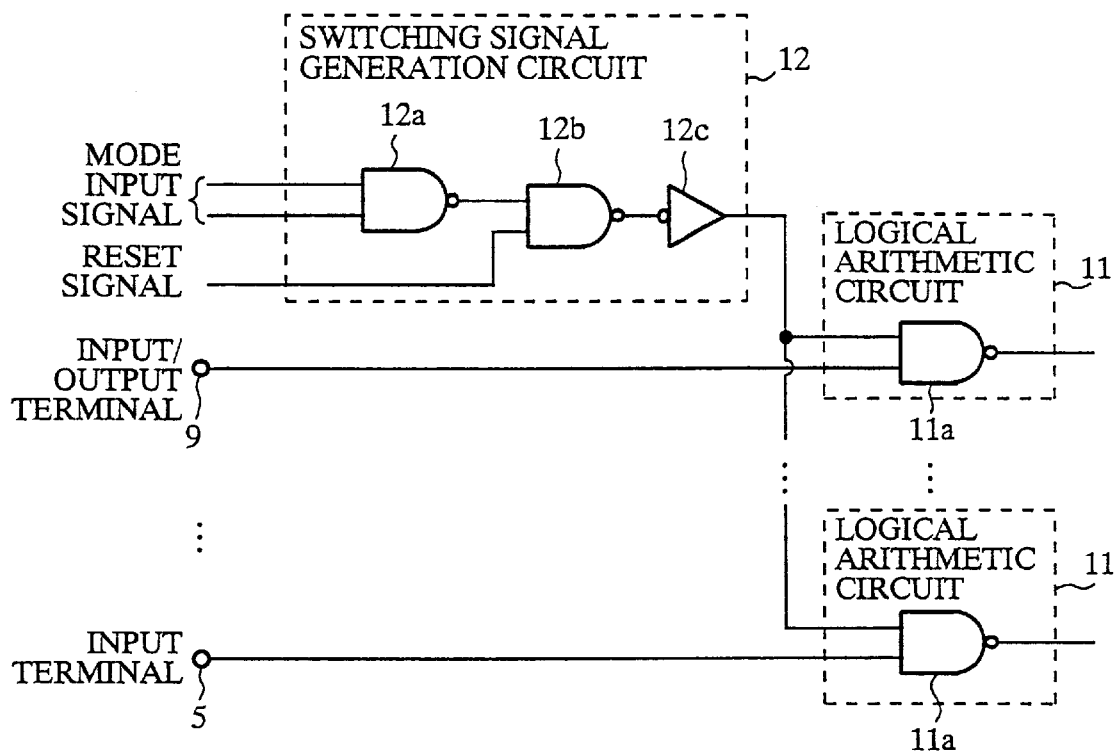
FIG. 2 is a block diagram showing a detailed configuration of each logical arithmetic circuit and peripheral circuits thereof incorporated in the semiconductor integrated circuit device as the first embodiment according to the present invention.

FIG. 2 is a block diagram showing a detailed configuration of the logical arithmetic circuit 11 and peripheral circuits such as the switching signal generation circuit 12 incorporated in the semiconductor integrated circuit device as the first embodiment according to the present invention. In FIG. 2, the reference character 11a designates an inverse logical AND circuit of two inputs (as a two input NAND circuit) for inputting the mode switching signal from the switching signal generation circuit 12 and an input signal transferred through each input terminal 5 or 9, for performing the logical AND operation, and for outputting an inverse value of the result of the logical AND operation. Each of the logical arithmetic circuits 11 comprises the inverse logical AND circuit of two inputs (as the two input NAND circuit).

The reference character 12a denotes an inverse logical AND circuit (as a NAND circuit) for a mode judgement for outputting an inverse value (as a mode judgement signal) of the result of the logical AND operation of the two mode input signals. The reference character 12b denotes an inverse logical AND circuit (as a NAND circuit) of the generation of a negate signal, for outputting an inverted value (as the negate signal) of the result of the logical AND operation between the mode judgement signal and the reset signal. The reference character 12c indicates an inverter circuit of a mode switching signal, for generating the mode switching signal by inverting the level of the negate signal provided from the inverse logical AND circuit of the generation of a negate signal. Thus, the switching signal generation circuit comprises the inverse logical AND circuit (as the NAND circuit) 12a, the inverse logical AND circuit (as the NAND circuit) 12b, and the inverter circuit 12c.

Figure 3:
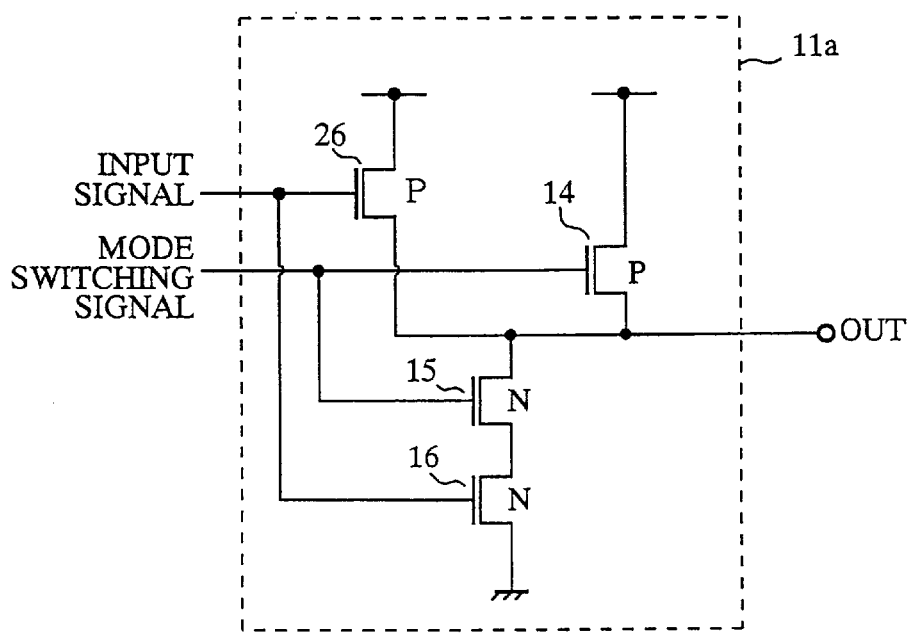
FIG. 3 is a block diagram showing a detailed configuration of the logical arithmetic circuit incorporated in the semiconductor integrated circuit device as the first embodiment according to the present invention.

FIG. 3 is a block diagram showing a detailed configuration of the inverse logical AND circuit of two inputs (as the two input NAND circuit) 11a forming the logical arithmetic circuit 11 incorporated in the semiconductor integrated circuit device as the first embodiment according to the present invention. In FIG. 3, the reference number 26 designates a first P channel MOS transistor whose gate inputs the input signals from the input/output terminal 9 and the input terminal 5 and whose source is connected to a high voltage power source. The reference number 14 denotes a second P channel MOS transistor whose gate inputs the mode switching signal and whose source is connected to the high voltage power source. The reference number 16 indicates a first N channel MOS transistor whose gate inputs the input signals from the input/output terminal 9 and the input terminal 5 and whose drain is connected to a low voltage power source (as the ground voltage power source). The reference number 15 indicates a second N channel MOS transistor whose gate inputs the mode switching signal and whose drain is connected to the source of the first N channel MOS transistor 16 whose drain is connected to the low voltage power source. The drains of both the first and second P channel MOS transistors 26 and 14 are connected to the source of the second N channel MOS transistor whose drain is connected to the source of the first N channel MOS transistor 16.

FIG. 4 is a block diagram showing a detailed configuration of the input/output buffer 10 and the peripheral circuits such as the I/O port 3, the logical arithmetic circuit 11 and the like incorporated in the semiconductor integrated circuit device as the first embodiment according to the present invention. In FIG. 4, the reference character 10a designates an output driver for outputting the data items, that have been set in the I/O port 3, to the logical arithmetic circuit 11 according to the level of the output signal transferred from the I/O setting register 13. The data items transferred from the logical arithmetic circuit 11 are transferred to outside devices (not shown) through the input/output terminal 9. The reference number 10b denotes an input driver for outputting the input signal, that is transferred from the input/output terminal 9 through the logical arithmetic circuit 11, to the I/O port 3 when the level of the output signal from the I/O setting register 13 becomes a different level from the level of the output signal to be used by the output driver 10a transferred from the I/O setting register 13.

Next, a description will be given of the operation of the semiconductor integrated circuit device of the first embodiment.

FIG. 5 is an explanation diagram showing a corresponding relationship between the two mode signals (having the levels of "1" and "0" shown in FIG. 5) and operation modes (such as "the normal operation mode", . . . , "the boot operation mode" shown in FIG. 5) in the semiconductor integrated circuit device having the above configuration as the first embodiment of the present invention. The two mode signals are inputted into the semiconductor integrated circuit device. The operation modes include the normal operation mode, the boot operation mode, and the like that are set based on the two mode signals. In FIG. 5, when both the two mode signals are 1 (a high level), the semiconductor integrated circuit device of the first embodiment enters the boot operation mode, and when the two mode signals are not the high level, it enters other operation modes other than the boot operation mode.

First, in the normal operation mode in the semiconductor integrated circuit device of the first embodiment, when the reset signal inputted through the input terminal 5 to be used for input of the reset is canceled or released, that is, when the reset signal is the high level, the CPU 1 initiates the sequence operation based on the data items stored in the flash memory circuit 2 and the CPU 1 then executes predetermined arithmetic operations and control operations, and other operations.

Next, when the reset signal is canceled or released, namely when it becomes the high level, during the boot operation mode, under the control of the CPU 1, the operation flow jumps to the start address of the boot program stored in the ROM 25. Thereby, the CPU 1 executes the boot program so that the data items inputted through the input terminals 5 to be used for data input are written into flash memory circuit 2 sequentially. Because the level of both the two mode signals is set to the high level during the boot operation mode, the output signal transferred from the inverse logical AND circuit (as the NAND circuit) 12a for the mode judgement becomes the low level, and the negate signal becomes the high level, and the mode switching signal becomes low level. Thereby, each of the logical arithmetic circuits 11 inputs the mode switching signal of the low level, so that the second N channel MOS transistor 15 enters the OFF state and the second P channel MOS transistor 14 enters the ON state in each of the logical arithmetic circuits 11 enters the OFF state.

Accordingly, each of the logical arithmetic circuits 11 provides the signal of the high level to the internal circuits such as input/output buffer 10 and the input buffers 7, connected to the signal lines on which the logical arithmetic circuits 11 are located, in spite of the presence and the magnitude of the level of the input signals provided to the input/output terminals 9 and the input terminals 5. In addition to this, because each of the second N channel MOS transistors 15 in the logical arithmetic circuits 11 enters the OFF state, no penetrate current flows.

Furthermore, because the reset signal is inputted to the switching signal generation circuit 12 and because the above negate signal is generated by performing the inverse logical AND operation between the reset signal and the output signal from the inverse logical AND circuit (as the NAND circuit) 12a for the mode judgement, it is possible to set the logical arithmetic circuits 11 and the internal circuits enter the same state of the boot operation mode even if while the reset signal is inputted to the semiconductor integrated circuit device, namely even if the reset signal is the low level.

Thereby, when the semiconductor integrated circuit device has the configuration in which the flash memory circuit 2 and the CPU 1 are incorporated in the same semiconductor chip, it is possible to set data items corresponding to applications into the flash memory circuit 2. Thereby, when the boot up operation for the normal operation mode is executed, the CPU 1 reads the data items stored in the flash memory circuit 2 sequentially in order to perform the initial setting. It is thereby possible to provide the semiconductor integrated circuit device that is highly applicable to general purpose use easily.

As described above, according to the first embodiment of the present invention, the semiconductor integrated circuit device has the configuration in which the logical arithmetic circuit is placed between the internal circuits and each of the input terminals not to be used during the boot operation mode, and the logical operation between the input signal received through each of the input terminals 5 and the mode switching signal transferred from the switching signal generation circuit 12 is executed, and the operation result sets the state of the circuits forming the logical arithmetic circuits 11 based on the logical operation result into the stable low level. Accordingly, even if the level of each of the input terminals 5 enter the floating state during the boot operation mode, it is possible to prevent flowing of the penetrate current because the N channel CMOS transistors forming the logical arithmetic circuits 11 are set to the OFF state. As a result, the first embodiment has the effect to suppress the power consumption during the boot operation mode to the power consumption of the normal operation mode.

In addition, according to the first embodiment of the present invention, because the semiconductor integrated circuit device has the configuration in which the logical arithmetic circuit 11 comprises the inverse logical AND circuit of two inputs (as the two input NAND circuit) 11a and because the mode switching signal is set to the low level during the boot operation mode, it is possible to set the level of the output from each of the logical arithmetic circuits 11 to the low level even if the level of the input signal provided to the input terminal 5 is changed. Accordingly, it is possible to prevent that the circuits in each of the logical arithmetic circuits 11 perform undesired operation by changing the level of the input signal 5, and it is also possible to suppress the power consumption during the boot operation mode.

Moreover, according to the first embodiment of the present invention, the semiconductor integrated circuit device has the configuration in which the logical arithmetic circuit is also located between each of the input/output terminals 9 and each of the input/output buffers 10 in addition to between each of the input terminals 5 and each of the input buffers 7. Accordingly, it is possible to fix both the state of the input driver and the output driver forming each of the input/output buffers 10 even if the input/output terminal 9 is set for input in order to prevent causing a data collision between the output signal from the input/output buffer 9 and the output signal of other circuit. It is thereby possible to suppress the power consumption during the boot operation mode.

Second embodiment

FIG. 6 is a block diagram showing a configuration of a logical arithmetic circuit 110 and peripheral circuits around it incorporated in the semiconductor integrated circuit device as the second embodiment according to the present invention. In FIG. 6, the reference number 27 designates one of the input terminals 5 in the semiconductor integrated circuit device. Specifically, during the boot operation mode, the signal of the low level is inputted into this input terminal 27. The reference character 11b indicates an inverse logical AND circuit of three inputs (as a three input NAND circuit) for performing the logical AND operation among the input signal from the input terminal 27, the mode switching signal and the reset signal from the switching signal generation circuit 12, and the input signal from each input terminal 5 or 9 and for outputting the operation result to outside circuit (as the internal circuits in the semiconductor integrated circuit device) of the logical arithmetic circuit 110. Thus, the logical arithmetic circuit in the semiconductor integrated circuit device of the second embodiment comprises the inverse logical AND circuit of three inputs (as the three input NAND circuit). Because other circuit components in the semiconductor integrated circuit device of the second embodiment are the same as those of the first embodiment, the same reference number for them are used, and the explanation of them are therefore omitted here for brevity.

Figure 7:
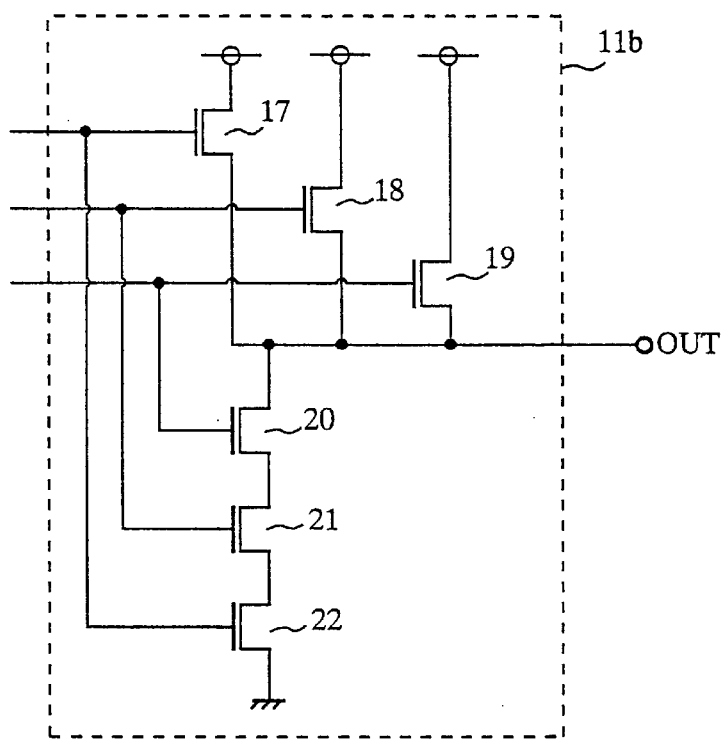
FIG. 7 is a transistor circuit diagram showing a detailed configuration of as a three input NAND circuit forming the logical arithmetic circuit incorporated in the semiconductor integrated circuit device as the second embodiment according to the present invention.

FIG. 7 is a transistor circuit diagram showing a detailed configuration of the inverse AND circuit 11b of three inputs (as the three input NAND circuit) forming the logical arithmetic circuit 110 incorporated in the semiconductor integrated circuit device as the second embodiment according to the present invention. FIG. 7 shows the configuration of the logical arithmetic circuit 110 comprising the inverse logical AND circuit of three inputs (as the three input NAND circuit) in the transistor level. In FIG. 7, the reference number 17 designates a third P channel MOS transistor whose gate receives the input signal and whose source is connected to the high voltage power source. The reference number 18 denotes a fourth P channel MOS transistor whose gate receives the reset signal and whose source is connected to the high voltage power source. The reference number 19 designates a fifth P channel MOS transistor whose gate receives the signal from the input terminal 27 and whose source is connected to the high voltage power source. The reference number 22 denotes a third N channel MOS transistor whose gate receives the signal from the input terminal and whose drain is connected to the low voltage power source. The reference number 21 designates a fourth N channel MOS transistor whose gate receives the reset signal and whose source is connected to the low voltage power source through the third N channel MOS transistor 22. The reference number 20 designates a fifth P channel MOS transistor whose gate receives the signal from the input terminal 27 and whose source is connected to the low voltage power source through both the fourth N channel MOS transistors 21 and the third N channel MOS transistors 22. In the configuration of the inverse logical AND circuit (as the three input NAND circuit) 11b, the drains of those three P channel MOS transistors 17, 18, and 19 are connected to the source of the fifth N channel MOS transistor 20 connected to the fourth N channel MOS transistor and the third N channel MOS transistor 22 in series. The voltage potential at the above connection node in the inverse logical AND circuit 11b is output to the internal circuits.

Next, a description will be given of the operation of the semiconductor integrated circuit device of the second embodiment.

In the semiconductor integrated circuit device of the second embodiment, both the two mode signals are set to the high level, and the reset signal is canceled or released under the condition in which the level of the voltage of the input terminal 27 is set to the low level. Then, the operation flow jumps to the start address of the boot program stored in the ROM 25 by the CPU 1 in order to execute the boot program. During the execution of the boot program, because the level of the voltage at the input terminal 27 is kept to the low level, the fifth N channel MOS transistor 20 in the logical arithmetic circuit 110 enters the OFF state and the fifth P channel MOS transistor 19 in the logical arithmetic circuit 110 enters the ON state. Other operations are the same as those of the semiconductor integrated circuit device of the first embodiment, therefore, the explanation of those operations is omitted here for brevity.

Accordingly, the logical arithmetic circuit 110 outputs the signal of the high level to the internal circuits such as the input/output buffer 10, the input buffer 7 connected to the logical arithmetic circuit 110 through the signal lines, and no penetrate current flows even if each of the input terminals 5 and the input/output terminals 9 receives the input signal having any level or no input signal. In addition, the internal circuits may be set into the states described above when the reset signal is inputted.

As described above, according to the second embodiment, each of the logical arithmetic circuits 110 is placed between the input terminal that is not used during the boot operation mode and each of the internal devices, and operates the logical arithmetic operation between the input signals through the input terminals 5 and the signal from the input terminal 27 that has a fixed voltage level during the boot operation mode, and because the states of the logical arithmetic circuits 110 and the internal circuits therein may be set to the stable low level, it is thereby possible to suppress the power consumption during the boot operation mode like the semiconductor integrated circuit device of the first embodiment.

In addition, according to the second embodiment of the present invention, because each of the logical arithmetic circuits 110 in the semiconductor integrated circuit device comprises the inverse logical AND circuit 11b of three inputs (as the three input NAND circuit) and because the signal of the low level is received through the input terminal 27 during the boot operation mode, it is possible to prevent that the logical arithmetic circuits 110 and the internal circuits therein perform undesired operations based on the change of a voltage level at each of the input terminals 5, furthermore, it is possible to suppress the power consumption during the boot operation mode.

Moreover, according to the second embodiment of the present invention, because the logical arithmetic circuit 110 is located between each of the input/output terminals 9 and each of the internal circuits in addition to between each input terminal 5 and each input buffer 7, it is possible to set both the input driver and the output driver forming each input/output buffer 10 into a fixed state even if the input/output terminals 9 are used only for input after the reset operation. It is also possible to suppress the power consumption during the boot operation mode.

Third embodiment

Figure 8:
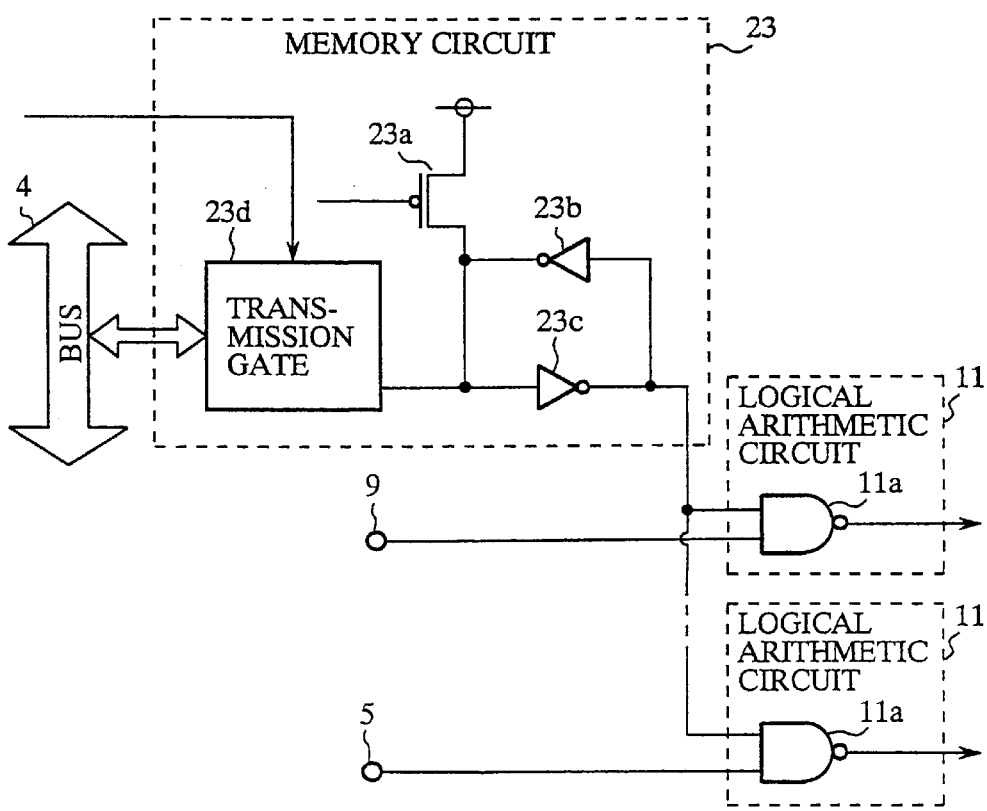
FIG. 8 is a block diagram showing a detailed configuration of a memory circuit and each logical arithmetic circuit incorporated in the semiconductor integrated circuit device as the third embodiment according to the present invention.

FIG. 8 is a block diagram showing a detailed configuration of a memory circuit 23 and the logical arithmetic circuit 11 incorporated in the semiconductor integrated circuit device as the third embodiment according to the present invention. In FIG. 8, the reference number 23 designates the memory circuit (as a second memory) for inputting both the reset signal and the start signal that is output by the CPU 1 when the boot operation mode is completed, and for storing the output state designated by both the reset signal and the start signal until the memory circuit 23 inputs a following start signal after the memory circuit 23 inputs the reset signal.

In FIG. 8, the reference character 23a designates a sixth P channel MOS transistor whose gate inputs the above reset signal and whose source is connected to the high voltage power source. The reference character 23c denotes a first inverter circuit connected to the drain of the sixth P channel MOS transistor 23a. The first inverter circuit 23c inverts the voltage of the drain of the sixth P channel MOS transistor 23a and outputs the level of the inverted voltage as the mode switching signal. The reference character 23b indicates a second inverter circuit for inputting the output from the first inverter circuit 23c and for inverting the level of this output and for outputting the inverted output to the first inverter circuit 23c. The reference character 23d designates a transmission gate for latching the data on the bus 4 when receiving the start signal and for outputting a level signal according to the latched data. The memory circuit 23 comprises the sixth P channel MOS transistor 23a, the first inverter circuit 23c, the second inverter circuit 23b, and the transmission gate 23d. Because other circuit components in the semiconductor integrated circuit device of the third embodiment are the same as those of the first embodiment, the same reference number for them are used, and the explanation of them are therefore omitted here for brevity.

Next, a description will be given of the operation of the semiconductor integrated circuit device of the third embodiment.

When the semiconductor integrated circuit device receives the reset signal, that is, when receiving the reset signal of the low level, the operation of the CPU 1 stops and the sixth P channel MOS transistor 23a in the memory circuit 23 enters the ON state. Then, the level of the drain of the sixth P channel MOS transistor 23a is controlled to the high level and the first inverter circuit 23c outputs the mode switching signal of the low level. Accordingly, in the same manner as the semiconductor integrated circuit device of the first embodiment, each of the logical arithmetic circuits 11 inputs the low level of the mode switching signal, so that the first N channel MOS transistor 16 in the logical arithmetic circuit 11 enters the OFF state.

Next, when the reset signal is canceled or released, that is, when the level of the reset signal is set to the low level, the CPU 1 initiates the operation in the operation mode that has been set. Accordingly, when the reset signal is canceled or released under the situation that has been set in the boot operation mode, the CPU 1 performs the boot program.

On the other hand, even if the reset signal is set to the high level, only the P channel MOS transistor 23a is set to the OFF state in the memory circuit 23 described above, the state of both the two inverter circuits 23b and 23c during the input of the reset signal may be kept. Accordingly, the mode switching signal is kept to the low level if only during the boot operation mode. Therefore, during the boot operation mode, the state of the logical arithmetic circuit that is connected to unused input terminal 5 and the internal circuits may be fixed in spite of the state of the other input terminal 5.

Furthermore, when the input terminal 5 connected to the logical arithmetic circuit 11 is used during the boot operation mode, or used during the normal operation mode after the boot operation mode, the start signal is provided to the transmission gate 23d under the situation that predetermined data items are set on the bus 4. Thereby, after the transmission gate 23d latches the data items on the bus 4, and it provides the signal of the low level to the first inverter circuit 23c. It is thereby possible to set the mode switching signal to the high level to be inputted to the logical arithmetic circuit 11. Other operations of the semiconductor integrated circuit device of the third embodiment are the same as the operations of the semiconductor integrated circuit device of the first embodiment, therefore the explanation of them is omitted here for brevity.

As described above, according to the third embodiment of the present invention, because the semiconductor integrated circuit device incorporates the memory circuit 23 to keep the output state that is set by the reset signal until a following start signal is received after the reset signal is inputted, and because the memory circuit 23 transfers its output to one of the logical arithmetic circuits located between the input terminal that is not used during the boot operation mode and the internal circuits, even if the input terminals that are not used during the boot operation mode to be executed after the reset operation enters the floating state, it is possible to set the state of the logical arithmetic circuits 11 and the internal circuits therein into the stable low level by receiving the output signal from the memory circuit 23. As a result, it is thereby possible to set the P channel MOS transistors or the N channel MOS transistors forming the logical arithmetic circuits into the OFF state, so that the present invention has the effects that no penetrate current flows and it is possible to suppress the power consumption.

In addition, because the semiconductor integrated circuit device of the third embodiment uses the inverse logical AND circuit (as the two input NAND circuit) 11a forming the logical arithmetic circuit 11, and the signal of the low level is inputted during the boot operation mode, it is possible to prevent performing the undesired operation of the logical arithmetic circuit 11 and the internal circuits therein and it is also possible to suppress the power consumption during the boot operation mode.

Furthermore, according to the third embodiment of the present invention, the semiconductor integrated circuit device has the configuration in which the logical arithmetic circuit 11 is also located between each of the input/output terminals 9 and each of the input/output buffers 10 in addition to between each of the input terminals 5 and each of the input buffers 7. Accordingly, it is possible to fix both the states of the input driver and the output driver forming each of the input/output buffers 10 even if the state of the input/output terminal 9 after the reset operation is set for input. It is thereby possible to suppress the power consumption during the boot operation mode.

Finally, according to the third embodiment, it is possible to set the unused terminal during the normal operation mode into a predetermined voltage level, it is not required to connect those terminal to the pull up resistance and a pull down resistance. This causes to decrease the number of the circuit components in the semiconductor integrated circuit.

Fourth embodiment

Figure 9:
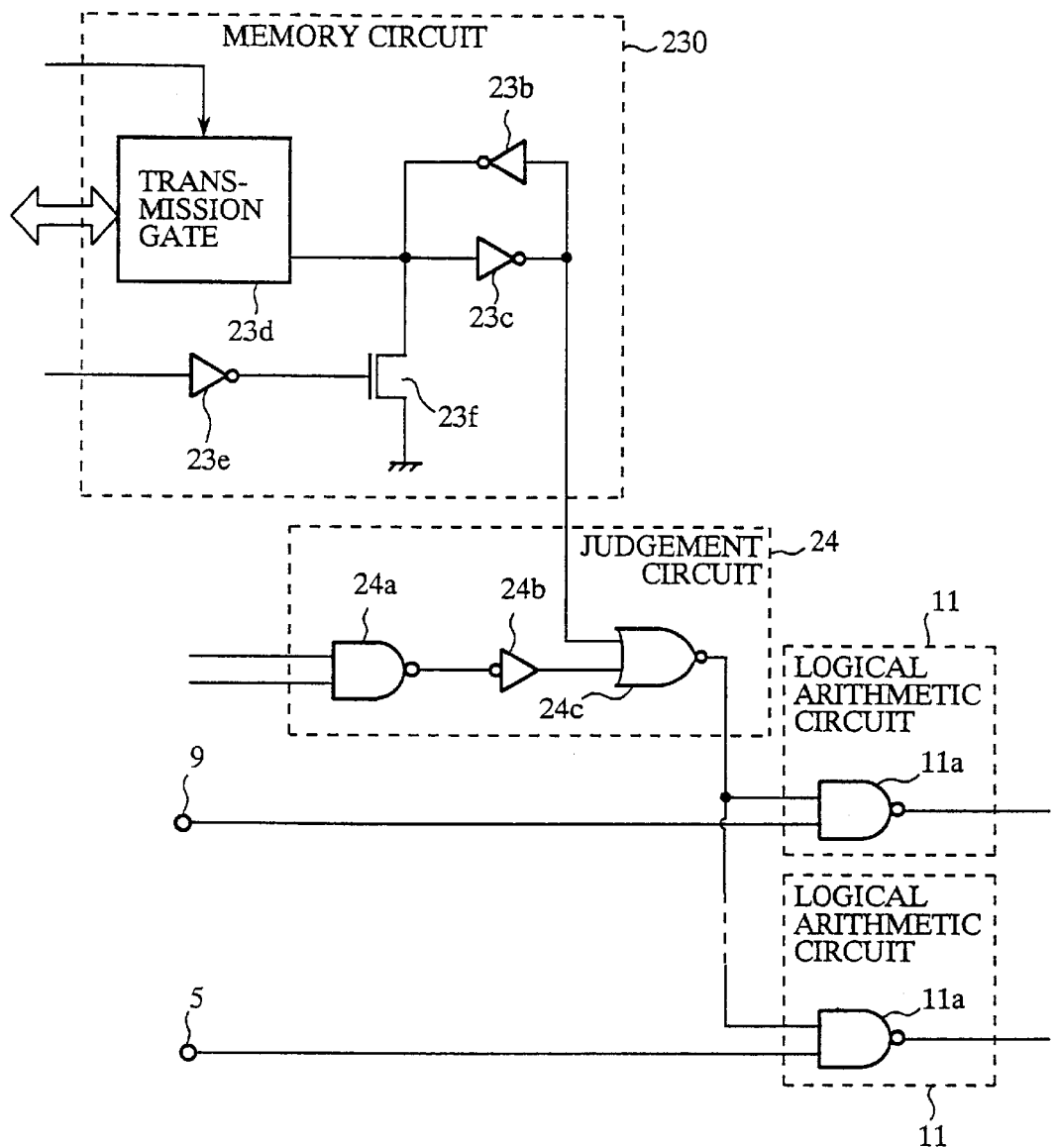
FIG. 9 is a block diagram showing a detailed configuration of each logical arithmetic circuit, a memory circuit, and a judgement circuit incorporated in the semiconductor integrated circuit device as the fourth embodiment according to the present invention.
Figure 10:
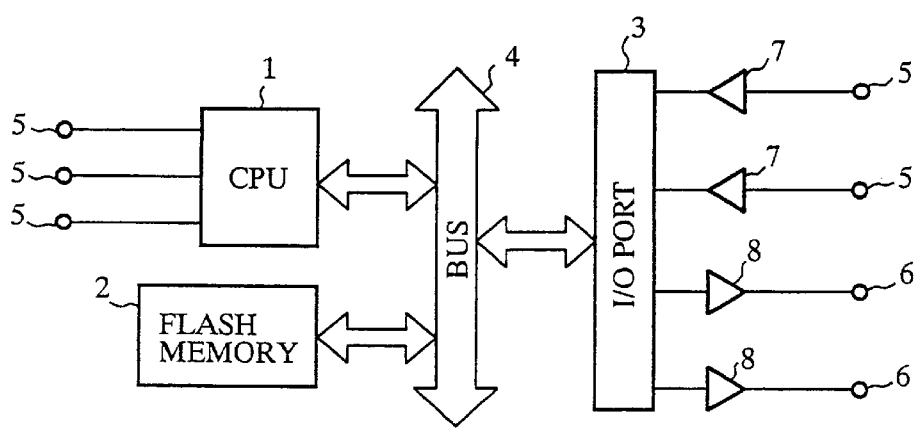
FIG. 10 is a block diagram showing a configuration of a conventional semiconductor integrated circuit in which a flash memory circuit and a CPU are mounted on a same semiconductor chip.

FIG. 9 is a block diagram showing a detailed configuration of the logical arithmetic circuit 11, a memory circuit 230, and a judgement circuit 24 incorporated in the semiconductor integrated circuit device as the fourth embodiment according to the present invention. In FIG. 9, the reference number 230 designates the memory circuit (as a third memory) for inputting the reset signal and the start signal to be output by the CPU 1 when the boot operation mode is completed and for storing the state set by the reset signal until a following start signal is received after the reset signal is received. The reference number 24 designates the judgement circuit for inputting the output from the memory circuit 2340 and the two mode input signals and for outputting the mode switching signal having the voltage level corresponding to the result of the arithmetic operation among the output from the memory circuit 230 and the two mode input signals to each of the logical arithmetic circuit 11. The reference character 24a denotes the inverse logical AND circuit (as the NAND circuit) for performing the inverse logical AND operation between the two mode input signals. The reference character 24b designates an inverter circuit for the judgement to invert the result of the inverse logical AND operation. The reference character 24c denotes an inverse logical OR circuit (as a NOR circuit) for judgement for inputting the output from the inverter circuit 24b for the judgement and for performing the inverse logical OR operation between the inputted values and for outputting the operation result to each of the logical arithmetic circuits 11 as the mode switching signal. Thus, the judgement circuit 24 comprises the inverse logical AND circuit (as the NAND circuit) 24a, the inverter circuit 24b, and the inverse logical OR circuit (as the NOR circuit) 24c.

In the memory circuit 230 in the semiconductor integrated circuit device of the fourth embodiment shown in FIG. 9, the reference character 23e designates an inverter circuit for memory for inverting the level of the reset signal. The reference character 23f denotes a sixth N channel MOS transistor whose gate inputs the inverted reset signal and whose drain is connected to the low voltage power source, and whose source is connected to the output of the second inverter circuit 23b and also connected to the input terminal of the first inverter circuit 23c. Because other circuit components in the semiconductor integrated circuit device of the fourth embodiment are the same as those of the third embodiment, the same reference number for them are used, and the explanation of them are therefore omitted here for brevity.

Next, a description will be given of the operation of the semiconductor integrated circuit device of the fourth embodiment.

The inverse logical AND circuit (as the NOR circuit) 24c for judgement outputs the signal of the low level only during the boot operation mode. Accordingly, the inverse logical OR circuit (as a NOR circuit) 24c outputs the signal of the low level while the level of the output of the memory circuit 230 is the high level, and during the boot operation mode. In addition, the memory circuit 230 outputs the signal of the high level during the receiving of the reset signal to the receiving of the start signal. Other operations of the semiconductor integrated circuit device of the fourth embodiment are the same as the operations of the semiconductor integrated circuit device of the third embodiment, therefore the explanation of them is omitted here for brevity.

As described above, according to the fourth embodiment, because the semiconductor integrated circuit device has the configuration in which the output of the memory circuit 230 controls that one input of the inputs in each of the logical arithmetic circuits 11 is set to the low level and the above input is set to the low level according to the mode signal during the boot operation mode, it is possible to have the same effect of the semiconductor integrated circuit device of the third embodiment, and it is also possible to keep the state of the input terminal that is not used during the boot operation mode into the stable state. It is therefore possible to have the effect to reduce the power consumption certainly.

As set forth, according to the present invention, because the semiconductor integrated circuit device having the flash memory circuit fabricated by using the CMOS fabrication process incorporates the logical arithmetic circuits, and because each logical arithmetic circuit is placed on a signal line through which each of the internal circuits is connected to each of the input terminals that being not used during the boot operation mode, and performs the logical operation between the input signal received through said input terminals and a signal that becomes a fixed signal level during the boot operation mode, and outputs the operation result to the internal devices, it is possible to set the state of the logical arithmetic circuits and the internal circuits therein into a stable level of the high voltage or the low voltage by using the signal that has a fixed level during the boot operation mode even if the input terminals not used during the boot operation mode enter the floating state. As a result, the N channel MOS transistor or the P channel MOS transistor in the CMOS transistors forming each logical arithmetic circuit and the internal circuits therein enters the OFF state, so that any penetrate current flows. Thereby, the present invention has the effect that it is possible to suppress the power consumption during the boot operation mode. In the present invention, the mode switching signal to switch the operation mode of the semiconductor integrated circuit device or the input signal received through the input terminal that is used during the boot operation mode may be used as the signal that has the fixed level during the boot operation mode.

In addition, according to the present invention, because the semiconductor integrated circuit device having the flash memory circuit fabricated by using the CMOS fabrication process incorporates the memory circuit and the logical arithmetic circuits, namely because the memory circuit inputs a reset signal and a start signal, and stores the output state of the memory circuit itself that has been set by receiving the reset signal until receiving of a following start signal, and because each of the logical arithmetic circuits is placed on a signal line through which each of the internal circuits is connected to each of the input terminals that are not used during the boot operation mode in which data items are written into the flash memory circuit, performs a logical operation between the input signal obtained through the input terminals and an output signal transferred from the memory circuit, and outputs an operation result to the internal devices, it is possible to set the state of the logical arithmetic circuits and the internal circuits therein into a stable level of the high voltage or the low voltage by using the output signal from the memory circuit even if the input terminals not used during the boot operation mode enter the floating state. As a result, the N channel MOS transistor or the P channel MOS transistor in the CMOS transistors forming each logical arithmetic circuit and the internal circuits therein enters the OFF state, so that any penetrate current flows. Thereby, the present invention has the effect that it is possible to suppress the power consumption during the boot operation mode.

Furthermore, according to the present invention, because the semiconductor integrated circuit device having the flash memory circuit fabricated by using the CMOS fabrication process incorporates the memory circuit, the judgement circuit, and the logical arithmetic circuits, namely because the memory circuit inputs a reset signal and a start signal, and stores an output state of the memory circuit itself that has been set by receiving the reset signal until receiving of a following start signal, and because the judgement circuit inputs an output signal from the memory circuit and a mode signal to switch operation modes of the semiconductor integrated circuit device, and outputs a judgement signal whose level during a state immediately following a reset state and during a boot operation mode in which data items are written into the flash memory has a different level from a level in other states, and because each of the logical arithmetic circuits is placed on a signal line through which each of the internal circuits is connected to each of the input terminals that are not used during the boot operation mode, performs a logical operation between an input signal inputted through said input terminals and the judgement signal, and outputs an operation result to the internal devices, it is possible to set the state of the logical arithmetic circuits and the internal circuits therein into a stable level of the high voltage or the low voltage by using the output signal from the judgement circuit even if the input terminals not used during the boot operation mode enter the floating state. As a result, the N channel MOS transistor or the P channel MOS transistor in the CMOS transistors forming each logical arithmetic circuit and the internal circuits therein enters the OFF state, so that any penetrate current flows. Thereby, the present invention has the effect that it is possible to suppress the power consumption during the boot operation mode.

In addition, according to the present invention, because the semiconductor integrated circuit device has the configuration in which each of the logical arithmetic circuits comprises the inverse logical AND circuit of two inputs (as the two input NAND circuit) for inputting an input signal received through each of the input terminals as one of the inputs and for inputting a signal of the low level during the boot operation mode as other input, it is possible to set the output of each of the logical arithmetic circuits into a stable level of the low voltage and possible to set the each of the logical arithmetic circuits and the internal circuits therein into a fixed state even if the level of each of the input terminals is changed during the boot operation mode. As a result, the present invention has the effect that it is possible to suppress the power consumption during the boot operation mode.

In general, each of the input/output terminals is set to the input state in order to prevent occurring a data collision between a data signal from the input/output terminal and from a data signal from other circuits. Therefore, because both the input buffer and the output buffer whose output corresponds to the output from the input buffer are connected to the input/output terminal, the present invention has the effect that the power consumption may be reduced most effectively when each of the logical arithmetic circuits is placed on a line through which each input/output terminal is connected to each internal circuit.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A semiconductor integrated circuit device fabricated by a Complementary Metal Oxide Silicon fabrication process (CMOS fabrication process), comprising:

a first memory circuit; and logical arithmetic circuits, each placed on a signal line through which each of internal circuits is connected to each of input terminals that being not used during a boot operation mode in which data items being written into said first memory circuit, for performing a logical operation between input signal inputted through said input terminals and a signal that becomes a fixed signal level during said boot operation mode, and for outputting an operation result to said internal devices.

2. A semiconductor integrated circuit device as claimed in claim 1, said logical arithmetic circuits inputs a mode switching signal, as said signal that becomes a fixed signal level during said boot operation mode, to switch operation modes of said semiconductor integrated circuit device.

3. A semiconductor integrated circuit device as claimed in claim 1, said logical arithmetic circuits inputs an input signal, as said signal that becomes a fixed signal level during said boot operation mode, transferred from said input signals that being used during said boot operation mode.

4. A semiconductor integrated circuit device fabricated by a Complementary Metal Oxide Silicon fabrication process (CMOS fabrication process), comprising:

a first memory circuit;

a second memory circuit for inputting a reset signal and a start signal, and for storing an output state of said own second memory circuit that has been set by receiving said reset signal until receiving of a following start signal; and logical arithmetic circuits, each placed on a signal line through which each of internal circuits is connected to each of input terminals that being not used during a boot operation mode in which data items being written into said first memory circuit, for performing a logical operation between input signal inputted through said input terminals and an output signal transferred from said second memory circuit, and for outputting an operation result to said internal devices.

5. A semiconductor integrated circuit device fabricated by a Complementary Metal Oxide Silicon fabrication process (CMOS fabrication process), comprising:

a first memory circuit;

a third memory circuit for inputting a reset signal and a start signal, and for storing an output state of said own third memory circuit that has been set by receiving said reset signal until receiving of a following start signal; and a judgement circuit for inputting an output signal from said third memory circuit and a mode signal to switch operation modes of said semiconductor integrated circuit device, and for outputting a judgement signal whose level during a state immediately following a reset state and during a boot operation mode in which data items being written into said first memory has a different level from a level in other states; and logical arithmetic circuits, each placed on a signal line through which each of internal circuits is connected to each of input terminals that being not used during said boot operation mode, for performing logical operation between input signal inputted through said input terminals and said judgement signal, and for outputting an operation result to said internal devices.

6. A semiconductor integrated circuit device as claimed in claim 1, wherein each of said logical arithmetic circuits comprises a two input NAND circuit for inputting said input signal transferred from each of said input terminals as one input and for inputting a signal whose level has a low voltage level during at least said boot operation mode as another input.

7. A semiconductor integrated circuit device as claimed in claim 2, wherein each of said logical arithmetic circuits comprises a two input NAND circuit for inputting said input signal transferred from each of said input terminals as one input and for inputting a signal whose level has a low voltage level during at least said boot operation mode as another input.

8. A semiconductor integrated circuit device as claimed in claim 3, wherein each of said logical arithmetic circuits comprises a two input NAND circuit for inputting said input signal transferred from each of said input terminals as one input and for inputting a signal whose level has a low voltage level during at least said boot operation mode as another input.

9. A semiconductor integrated circuit device as claimed in claim 4, wherein each of said logical arithmetic circuits comprises a two input NAND circuit for inputting said input signal transferred from each of said input terminals as one input and for inputting a signal whose level has a low voltage level during at least said boot operation mode as another input.

10. A semiconductor integrated circuit device as claimed in claim 5, wherein each of said logical arithmetic circuits comprises a two input NAND circuit for inputting said input signal transferred from each of said input terminals as one input and for inputting a signal whose level has a low voltage level during at least said boot operation mode as another input.

11. A semiconductor integrated circuit device as claimed in claim 1, wherein each of said logical arithmetic circuits comprises a three input NAND circuit for inputting said input signal transferred from each of said input terminals as a first input, for inputting a signal whose level has a low voltage level during at least said boot operation mode as a second input, and for inputting a reset signal as a third input.

12. A semiconductor integrated circuit device as claimed in claim 2, wherein each of said logical arithmetic circuits comprises a three input NAND circuit for inputting said input signal transferred from each of said input terminals as a first input, for inputting a signal whose level has a low voltage level during at least said boot operation mode as a second input, and for inputting a reset signal as a third input.

13. A semiconductor integrated circuit device as claimed in claim 3, wherein each of said logical arithmetic circuits comprises as a three input NAND circuit for inputting said input signal transferred from each of said input terminals as a first input, for inputting a signal whose level has a low voltage level during at least said boot operation mode as a second input, and for inputting a reset signal as a third input.

14. A semiconductor integrated circuit device as claimed in claim 4, wherein each of said logical arithmetic circuits comprises a three input NAND circuit for inputting said input signal transferred from each of said input terminals as a first input, for inputting a signal whose level has a low voltage level during at least said boot operation mode as a second input, and for inputting a reset signal as a third input.

15. A semiconductor integrated circuit device as claimed in claim 5, wherein each of said logical arithmetic circuits comprises a three input NAND circuit for inputting said input signal transferred from each of said input terminals as a first input, for inputting a signal whose level has a low voltage level during at least said boot operation mode as a second input, and for inputting a reset signal as a third input.

16. A semiconductor integrated circuit device as claimed in claim 1, wherein each of said logical arithmetic circuits is placed on a signal line through which each of input/output terminals as one of said input terminals is connected to each of said internal circuits.

17. A semiconductor integrated circuit device as claimed in claim 4, wherein each of said logical arithmetic circuits is placed on a signal line through which each of input/output terminals as one of said input terminals is connected to each of said internal circuits.

18. A semiconductor integrated circuit device as claimed in claim 5, wherein each of said logical arithmetic circuits is placed on a signal line through which each of input/output terminals as one of said input terminals is connected to each of said internal circuits.

19. A semiconductor integrated circuit device as claimed in claim 1, wherein said first memory circuit is a flash memory circuit.

20. A semiconductor integrated circuit device as claimed in claim 4, wherein said first memory circuit is a flash memory circuit.

* * * * *